United States Patent
Cierniak

(10) Patent No.: US 7,752,222 B1
(45) Date of Patent: Jul. 6, 2010

(54) FINDING TEXT ON A WEB PAGE

(75) Inventor: Michal Cierniak, Campbell, CA (US)

(73) Assignee: Google Inc., Mountain View, CA (US)

( * ) Notice: Subject to any disclaimer, the term of this patent is extended or adjusted under 35 U.S.C. 154(b) by 376 days.

(21) Appl. No.: 11/781,214

(22) Filed: Jul. 20, 2007

(51) Int. Cl.
*G06F 17/30* (2006.01)

(52) U.S. Cl. ...................... 707/769; 715/234

(58) Field of Classification Search .......... 707/999.001, 707/999.003, 999.1, 999.2; 715/234
See application file for complete search history.

(56) References Cited

U.S. PATENT DOCUMENTS 6,359,574 B1 * 3/2002 Yariv ......................... 341/50
2004/0010752 A1 * 1/2004 Chan et al. .................. 715/513

OTHER PUBLICATIONS

Andrew Lulham, Information Integration and Entity Identification, Jun. 2005, University of Bristol, pp. 1-32.*

* cited by examiner

*Primary Examiner*—Fred I Ehichioya
(74) *Attorney, Agent, or Firm*—Fredrik Mollborn; Mollborn Patents, Inc

(57) ABSTRACT

Methods and apparatus, including computer program products, implementing and using techniques for searching for a string of characters on a web page. A user input is received containing a text search string to be identified on a web page loaded in a web browser on a computer. A common substring between the text search string and a hypertext markup language representation of the web page is determined. A document object model tree node that includes the common substring is identified. It is verified a remainder of the text search string is included in one or more surrounding nodes of the document object model tree.

24 Claims, 3 Drawing Sheets

FINDING TEXT ON A WEB PAGE

BACKGROUND

This invention relates to searching for contents on web pages. Web browsers that display web pages commonly support extensibility by allowing third-party plug-ins. One example of a plug-in is a toolbar. In general toolbars provide additional functionality, such as searching for and highlighting text on a web page, storing bookmarks for web pages, blocking unwanted web pages from being displayed, filling out web forms, and so on. One example of a toolbar is the Google Toolbar, which is provided by Google Inc. of Mountain View, Calif.

As is well known to those of ordinary skill in the art, typically, a web page is represented internally in a web browser as a DOM (Document Object Model) tree. The DOM tree corresponds to the structure of the web page as implied by the HTML (HyperText Markup Language) tags used in creating the web page, and allows various types of scripts and programming languages to modify the content and visual presentation of the web page in the browser. Typically, any text contained between two HTML tags is stored in a single node of the DOM tree. When a web page is loaded in a browser, the browser provides the corresponding DOM tree representation to the toolbar, which performs its operations on the DOM tree.

As was mentioned above, often browsers provide a search function that the plugins can use to search for a certain text segment, such as a word or phrase, on a web page. However, this function typically only finds text that is contained in a single DOM node. For example, assume that the HTML code specifies:

<p>This is an<b>important</b>thing.</p>

The built-in search function in the web browser would find the phrase "is an" because this phrase is not broken by HTML tags. However, the search function would not find the phrase "an important thing," because the phrase is broken by HTML tags indicating that the word "important" should be shown in bold font. Thus, there is a need to provide improved methods for text searching on web pages

SUMMARY

In general, in one aspect, the various embodiments provide methods and apparatus, including computer program products, implementing and using techniques for searching for a string of characters on a web page. A user input is received containing a text search string to be identified on a web page loaded in a web browser on a computer. A common substring between the text search string and a hypertext markup language representation of the web page is determined. A document object model tree node that includes the common substring is identified. It is verified a remainder of the text search string is included in one or more surrounding nodes of the document object model tree.

Advantageous implementations can include one or more of the following features. Determining a common substring can include identifying a longest common substring between the text search string and the hypertext markup language representation of the web page. Two or more long common substrings between the text search string and the hypertext markup language representation of the web page can be identified, and each of the two or more long common substrings can be examined to find the longest common substring between the text search string and the two or more long common substrings. Identifying two or more long common substrings can include identifying approximately 3 to 5 long common substrings.

Determining a common substring can be performed using a longest common substring algorithm of complexity $O(nm)$, where n is the length of the text search string and m is the length of the hypertext markup language representation of the web page. Verifying that a remainder of the text search string is included in one or more surrounding nodes can include examining one or more nodes located to the left of the node with the common sub string in the document object model tree to match characters left of the common substring in the text search string, and examining one or more nodes located to the right of the node with the common substring in the document object model tree to match characters right of the common substring in the text search string.

The text search string can be highlighted on the webpage using a toolbar plug-in in the web browser, the toolbar plug-in operating on the document object model representation of the web page. The text search string can be a string of alphanumeric characters. The he common substring can be stored and used on a subsequent visit to the web page as a guide to locate the text search string.

Various implementations can include one or more of the following advantages. It is possible to quickly find and perform operations on text strings in an HTML document, even when the text strings span multiple HTML tags, that is, when the text strings span multiple nodes of a DOM tree. Text strings can be found even if minor edits have been made to the text on the web page or the text on the web page contains minor typographical errors.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

The invention will be described below by way of example and with reference to a text finding application in a toolbar installed as a plug-in in a web browser. However, it should be realized that the toolbar is not a necessary feature, and that the techniques of the various embodiments of the invention can be successfully applied in the web browsers themselves or in other types of plugins to a web browser for the purpose of finding text strings on a web page. It should also be noted that a text string, as used herein, includes any type of characters that can be entered in a computer by a user, or any type of characters that can be displayed on a web page. That is, the text string is by no means limited to alphanumeric characters.

Figure 1:
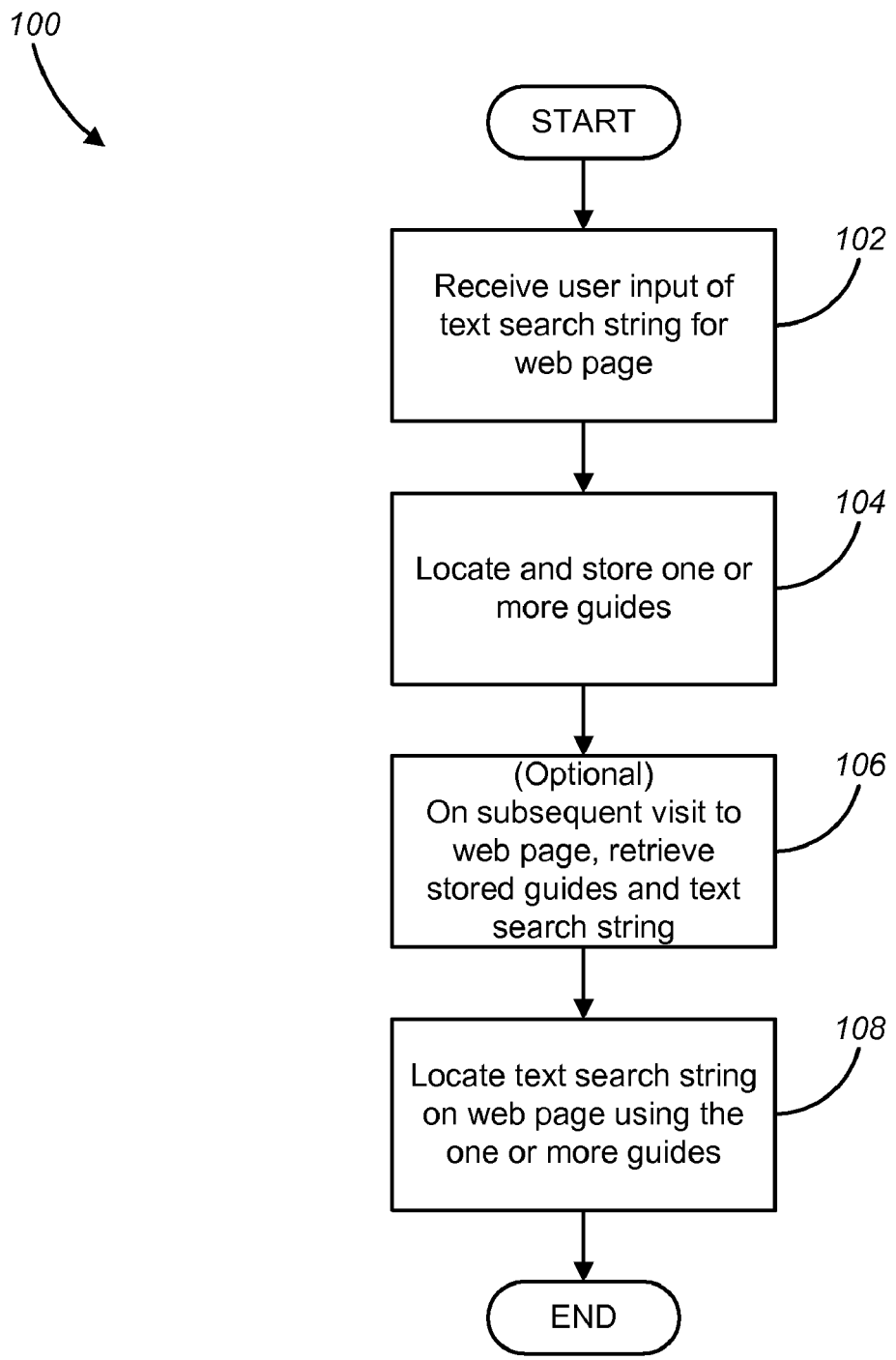
FIG. 1 shows a schematic flowchart for searching for a text string on a web page, in accordance with one embodiment of the invention.

As shown in FIG. 1, a process (100) for searching for a string of text begins by receiving user input of a text search string to search for on a web page (step 102) displayed in a web browser on the user's computer. As an illustrative example, assume that the same web page is used which was discussed above, that is:

<p>This is an<b>important</b>thing.</p> and that the search string input by the user is "an important thing".

Next, the process locates and stores one or more guides to be used in finding the text search string (step 104). A guide, as defined herein, is a substring of the text search string that is shorter than the text search string itself. The process for identifying the guides will now be discussed with reference to FIG. 2, which shows a detailed flowchart of step 104 of FIG. 1.

Figure 2:
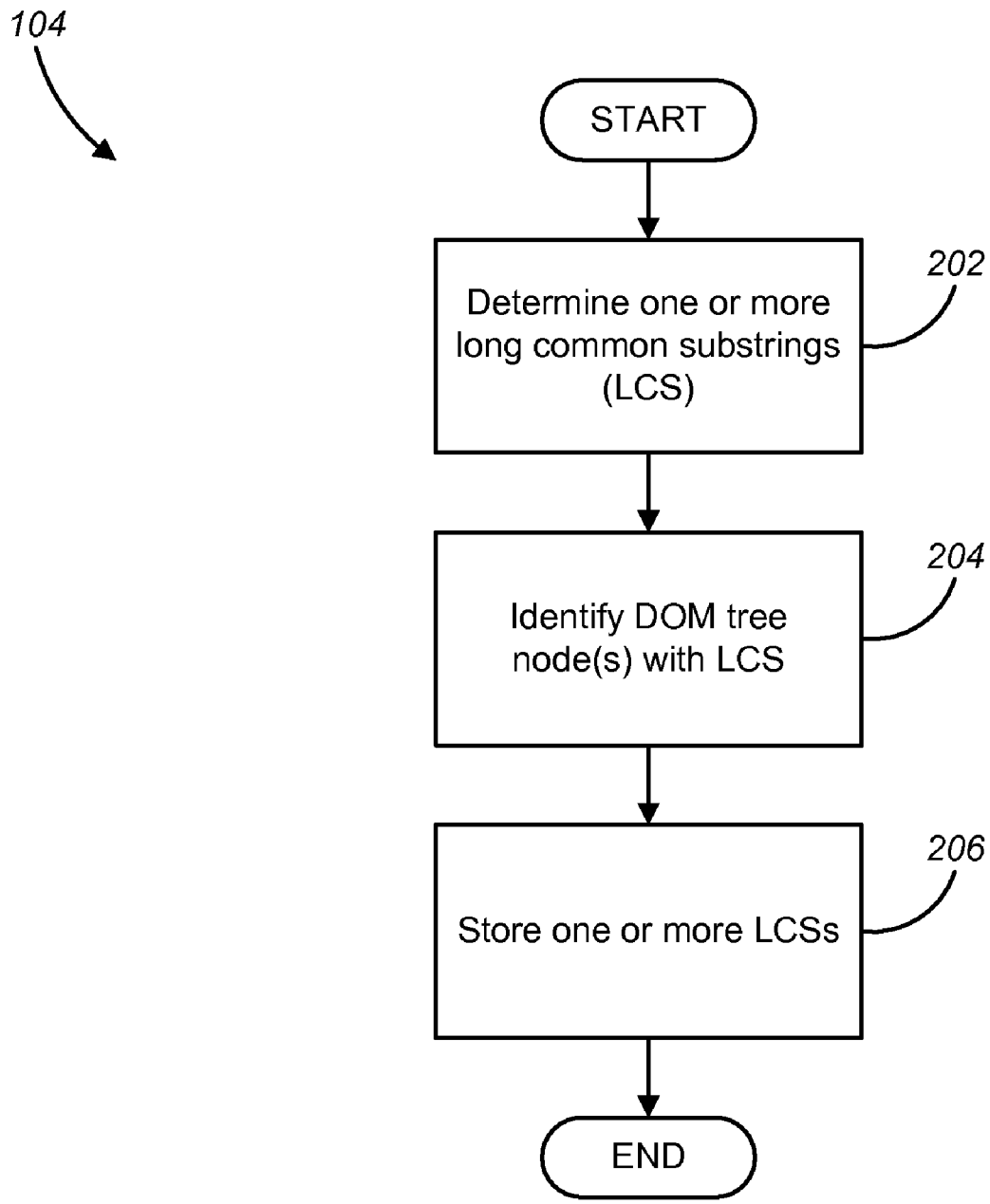
FIG. 2 shows a detailed flowchart of how the guides are located in step 104 of FIG. 1, in accordance with one embodiment of the invention.

As can be seen in FIG. 2, the process for identifying the one or more guides starts by determining one or more long common substrings (LCS) of the text search string and the HTML version of the web page (step 202). In one implementation, this involves finding the longest single string that is a substring both of the text search string entered by the user and the text on the HTML version of the web page. The LCS can be found, for example, by using a Longest Common Substring algorithm, which is familiar to those of ordinary skill in the art. In this case, the LCS is the word "important" since this substring is not interrupted by any HTML tags. Thus that the substring is entirely contained in a single DOM tree node and can be located using the built-in search function of the web browser, as described above. Furthermore, since the identified substring is the longest common substring, it is also likely that the substring is long enough to be unique on the web page. This identified LCS is then used as a guide in the remainder of the process, as will be described below.

In some implementations, several "sufficiently long" substrings are located to be used as guides instead of a single longest substring. This can be done, for example, by processing the HTML text of the web page in segments of about 100 characters each, as opposed to processing the entire web page. If the longest common substring for a segment and the text search string is a "good" guide, that is, the LCS is unique on the web page, this LCS is selected as a guide. Since the complexity for a dynamic programming implementation of the Longest Common Substring algorithm is O(mn), where m and n are the lengths of the two strings, finding several "sufficiently long" substrings by using shorter segments of the web page (in contrast to the single longest substring by using the whole web page) can save significant computing time and resources. In some implementations, about 3-5 substrings is an appropriate number of substrings to be located.

After the one or more LCSs have been located, the process identifies the DOM tree nodes that contain the LCSs, i.e., the guides (step 204). Finally, the guides are stored (step 206) along with the text search string. The guides and the text search string can be stored either locally on the user's computer, or on a remote server, and can optionally be associated with a user identifier so that the guides can be retrieved by the same or other users at a later time when the web page is loaded. This can, for example, allow a user to highlight text on a web page during a first visit, and then see the text highlighted again on subsequent visits to the same web page.

Returning now to FIG. 1, after some time has passed, the user returns to the same web page. At that time, the guides and text search string that were previously stored are retrieved from storage (step 106). Finally, the text search string is located on the web page by using the one or more retrieved guides (step 108), which ends the process (100). The step of locating the text search string by using the one or more guides will now be explained in further detail with reference to FIG. 3, which shows a schematic flowchart illustrating the details of step 108.

Figure 3:
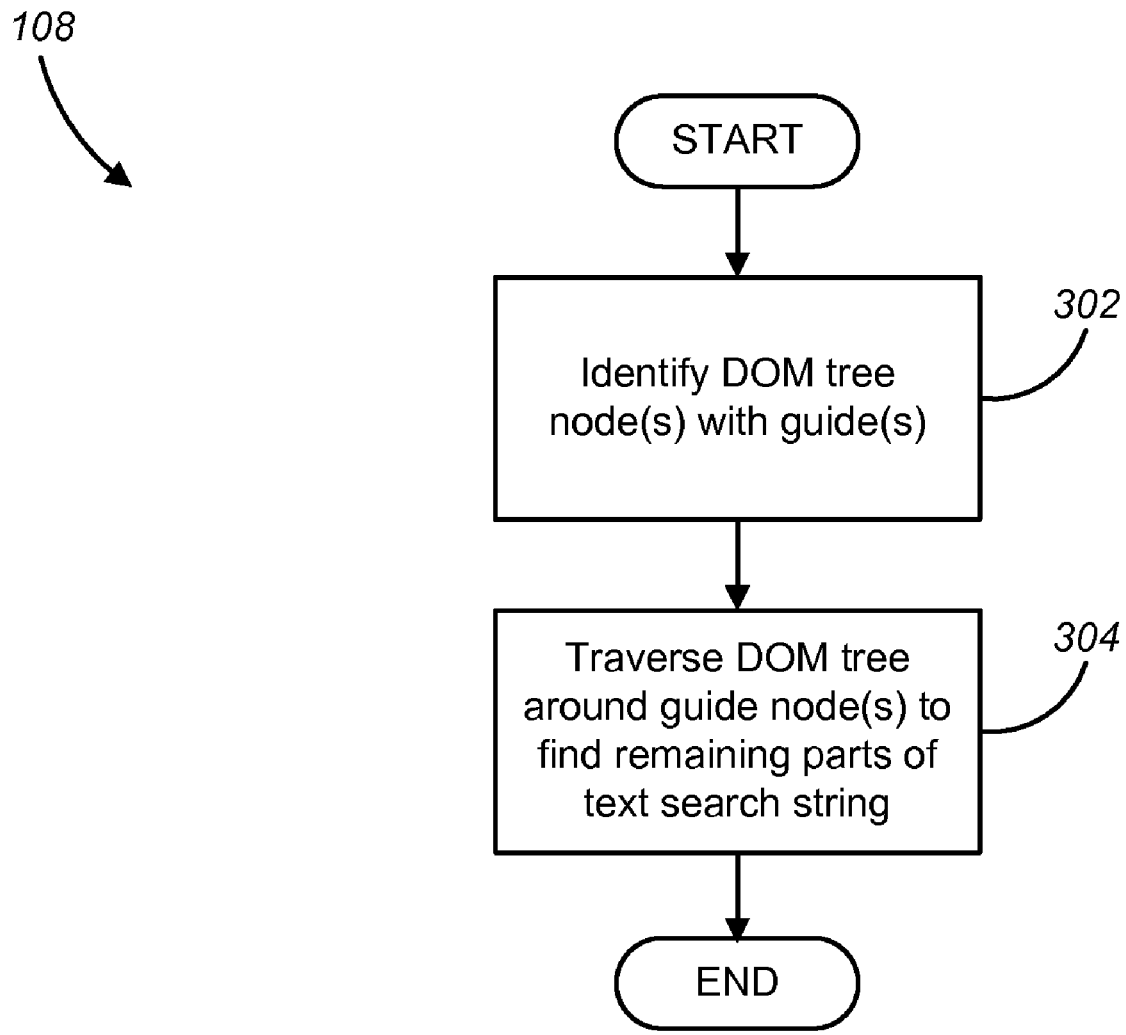
FIG. 3 shows a detailed flowchart of how a text search string is located on the web page in step 108 of FIG. 1, in accordance with one embodiment of the invention.

As can be seen in FIG. 3, first the DOM tree nodes with the retrieved guides are identified (step 302). Once the DOM tree nodes have been found, the DOM tree is traversed to verify that the remainder of the text search string is contained in the surrounding DOM tree nodes (step 304). In one implementation, the verification can occur as follows. Assume that the text search string is "xxxYYYzzz," that "YYY" is a guide identified in step 104, and that the corresponding DOM tree node is identified in step 302. Next, the length of "xxx" is determined and is used to traverse the DOM tree and extract the same number of characters from the DOM tree that are to the left of the string "YYY". This produces a string contained in the DOM tree to the left of "YYY", which can be compared with the string "xxx". If the string extracted from the DOM tree is identical to the "xxx" string, then the verification (step 108) is finished.

However, if the string extracted from the DOM tree and the "xxx" string are not identical, then the following heuristic approach is performed in one implementation of the invention. An approximate starting point in the DOM tree is determined by moving the length of "xxx" characters left from "YYY" in the DOM tree. Next, a substring of "xxx" is chosen and is attempted to be found around the selected approximate starting point. If the substring of "xxx" is found, then it can be assumed that the web page had been slightly modified and a new approximate starting point is determined. If no part of "xxx" is found, then it is assumed that the point located the length of "xxx" to the left of "YYY" is the start of the string.

Finally, a similar verification process is performed for the suffix "zzz", with "left" replaced by "right" above, as the skilled person in the art realizes, which ends the process (100). It should be noted that the above described verification is merely one example of a verification process, and that various changes and modifications will be apparent to those of ordinary skill in the art. As was described above, the main purpose of the verification is to examine the nodes surrounding the LCS node in the DOM tree, which can be done in a variety of ways.

It be noted that the approach of finding several long common substrings has an added advantage that if the user searches for text that the user knows was on the web page, but the web page was modified slightly between the first and second visit (for instance someone fixed a typographical error on the web page), the process is still likely to find the location on the page where the original text search string used to be. This can be important in one of the applications of this technique, where the user selects text on a web page and on a subsequent return visit to the same web page wants to find the same place on the web page, even if the page was subject to small edits.

The above described techniques for finding a text string on a web page can be used in a wide range of applications. For example, a toolbar in a web browser can use this technique to highlight text on web pages. In some implementations, the highlighted text sections can be stored on an external server and associated with the user so that the text remains highlighted at future visits by the user to the web page.

Various embodiments of the invention can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Various embodiments of the invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the various embodiments of the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, may be received from and outputted to the network, for example, in the form of a computer data signal embodied in a carrier wave. The above-described devices and materials will be familiar to those of skill in the computer hardware and software arts.

It should be noted that the various embodiments of the present invention employ various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The various embodiments of the present invention also relate to a device, system or apparatus for performing the aforementioned operations. The system may be specially constructed for the required purposes, or it may be a general-purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

A number of implementations have been described. Nevertheless, it will be understood that various modifications may be made. For example, text search strings can be input by any available input mechanism, such as a keyboard or a pointing device, a tablet, a stylus, a voice or handwriting recognizer, or any other well-known input device such as, of course, other computers. It should also be noted that there are other Longest Substring Algorithms that can be used, for example, algorithms that use a generalized suffix tree for the strings. Such algorithms may be faster and have a complexity of O(m+n), but may also require more memory, which potentially can make them less suitable for plug-in applications, even though they achieve the same purposes as the above-described algorithms. Furthermore, the process has been described above by way of example of a user visiting a web page one time and then subsequently returning to the same web page. It should, however, be noted that the above described techniques work equally well for a single visit to a web page and that there is no need for the user to first visit the web page and then come back to it at a later point in time to complete the rest of the operations. The techniques described herein are also applicable to any kind of markup language (e.g., Extended Markup Language (XML)), and should not be thought of as being exclusively applicable to HTML.

Furthermore, an alternative way of solving this problem is to first create a linear representation of the text of the web page without the HTML tags, and with pointers back to the DOM tree. This allows the phrase to first be found in the plain text version of the web page, and then the links to the DOM tree can be used to locate the corresponding text in the DOM tree.

Another alternative solution to this problem is to traverse the entire DOM tree while performing the search. This solution is more complex, as it does not use any built-in search function of the web browser, which can be sometimes more efficient than the same functionality implemented in the plug-in. Accordingly, other embodiments are within the scope of the following claims.

The invention claimed is:

1. A method performed by a computer for searching for a string of characters on a web page, the method comprising:
    receiving, from an input device connected to the computer, a user input containing a text search string to be identified on a web page loaded in a web browser on the computer, the web page being displayed to the user on a computer display;
    determining a common substring between the text search string and a markup language representation of the web page;
    identifying a document object model tree node that includes the common substring;

verifying that a remainder of the text search string and the common substring is included in one or more surrounding nodes of the document object model tree, wherein verifying includes:
examining one or more nodes located to the left of the node with the common substring in the document object model tree to match characters left of the common substring in the text search string; and
examining one or more nodes located to the right of the node with the common substring in the document object model tree to match characters right of the common substring in the text search string; and
displaying to the user the location of the text search string on the web page.

2. The method of claim 1, wherein determining a common substring includes:
identifying a longest common substring between the text search string and the hypertext markup language representation of the web page.

3. The method of claim 1, further comprising:
identifying two or more long common substrings between the text search string and the hypertext markup language representation of the web page; and
examining each of the two or more long common substrings to find the longest common substring between the text search string and the two or more long common substrings.

4. The method of claim 3, wherein identifying two or more long common substrings includes:
identifying approximately 3 to 5 long common substrings.

5. The method of claim 1, wherein determining a common substring is performed using a longest common substring algorithm of complexity O(nm), where n is the length of the text search string and m is the length of the hypertext markup language representation of the web page.

6. The method of claim 1, further comprising:
highlighting the text search string on the webpage using a toolbar plug-in in the web browser, the toolbar plug-in operating on the document object model representation of the web page.

7. The method of claim 1, wherein the text search string is a string of alphanumeric characters.

8. The method of claim 1, further comprising:
storing the common substring; and
using the stored common substring on a subsequent visit to the web page as a guide to locate the text search string.

9. A machine-readable storage device, storing a computer program product, comprising instructions operable to cause a computer to:
receive, from an input device connected to the computer, a user input containing a text search string to be identified on a web page loaded in a web browser on the computer, the web page being displayed to the user on a computer display;
determine a common substring between the text search string and a hypertext markup language representation of the web page;
identify a document object model tree node that includes the common substring;
verify that a remainder of the text search string and the common substring is included in one or more surrounding nodes of the document object model tree, wherein the instructions to verify includes instructions to:
examine one or more nodes located to the left of the node with the common substring in the document object model tree to match characters left of the common substring in the text search string; and
examine one or more nodes located to the right of the node with the common substring in the document object model tree to match characters right of the common substring in the text search string; and
display to the user the location of the text search string on the web page.

10. The computer program product of claim 9, wherein the instructions to determine a common substring include instructions to:
identify a longest common substring between the text search string and the hypertext markup language representation of the web page.

11. The computer program product of claim 9, further comprising instructions operable to cause the computer to:
identify two or more long common substrings between the text search string and the hypertext markup language representation of the web page; and
examine each of the two or more long common substrings to find the longest common substring between the text search string and the two or more long common substrings.

12. The computer program product of claim 11, wherein the instructions to identify two or more long common substrings include instructions to:
identify approximately 3 to 5 long common substrings.

13. The computer program product of claim 9, wherein the instructions to determine a common substring are performed using a longest common substring algorithm of complexity O(nm), where n is the length of the text search string and m is the length of the hypertext markup language representation of the web page.

14. The computer program product of claim 9, further comprising instructions causing the computer to:
highlight the text search string on the webpage using a toolbar plug-in in the web browser, the toolbar plug-in operating on the document object model representation of the web page.

15. The computer program product of claim 9, wherein the text search string is a string of alphanumeric characters.

16. The computer program product of claim 9, further comprising instructions causing the computer to:
store the common substring; and
use the stored common substring on a subsequent visit to the web page as a guide to locate the text search string.

17. An apparatus for searching for a string of characters on a web page, comprising:
input means for receiving a user input containing a text search string to be identified on a web page loaded in a web browser on a computer, the web page being displayed to the user on a computer display;
means for determining a common substring between the text search string and a hypertext markup language representation of the web page;
means for identifying a document object model tree node that includes the common substring;
means for verifying that a remainder of the text search string and the common substring is included in one or more surrounding nodes of the document object model tree, wherein the means for verifying includes:
means for examining one or more nodes located to the left of the node with the common substring in the document object model tree to match characters left of the common substring in the text search string; and
means for examining one or more nodes located to the right of the node with the common substring in the document object model tree to match characters right of the common substring in the text search string; and means for displaying to the user on the computer display the location of the text search string on the web page.

18. The apparatus of claim 17, wherein the means for determining a common substring include:
means for identifying a longest common substring between the text search string and the hypertext markup language representation of the web page.

19. The apparatus of claim 17, further comprising:
means for identifying two or more long common substrings between the text search string and the hypertext markup language representation of the web page; and
means for examining each of the two or more long common substrings to find the longest common substring between the text search string and the two or more long common substrings.

20. The apparatus of claim 19, wherein the means for identifying two or more long common substrings include:
means for identifying approximately 3 to 5 long common substrings.

21. The apparatus of claim 17, wherein the means for determining a common substring use a longest common substring algorithm of complexity $O(nm)$, where n is the length of the text search string and m is the length of the hypertext markup language representation of the web page.

22. The apparatus of claim 17, further comprising:
means for highlighting the text search string on the webpage using a toolbar plug-in in the web browser, the toolbar plug-in operating on the document object model representation of the web page.

23. The apparatus of claim 17, wherein the text search string is a string of alphanumeric characters.

24. The apparatus of claim 17, further comprising:
means for storing the common substring; and
means for using the stored common substring on a subsequent visit to the web page as a guide to locate the text search string.

* * * * *